…

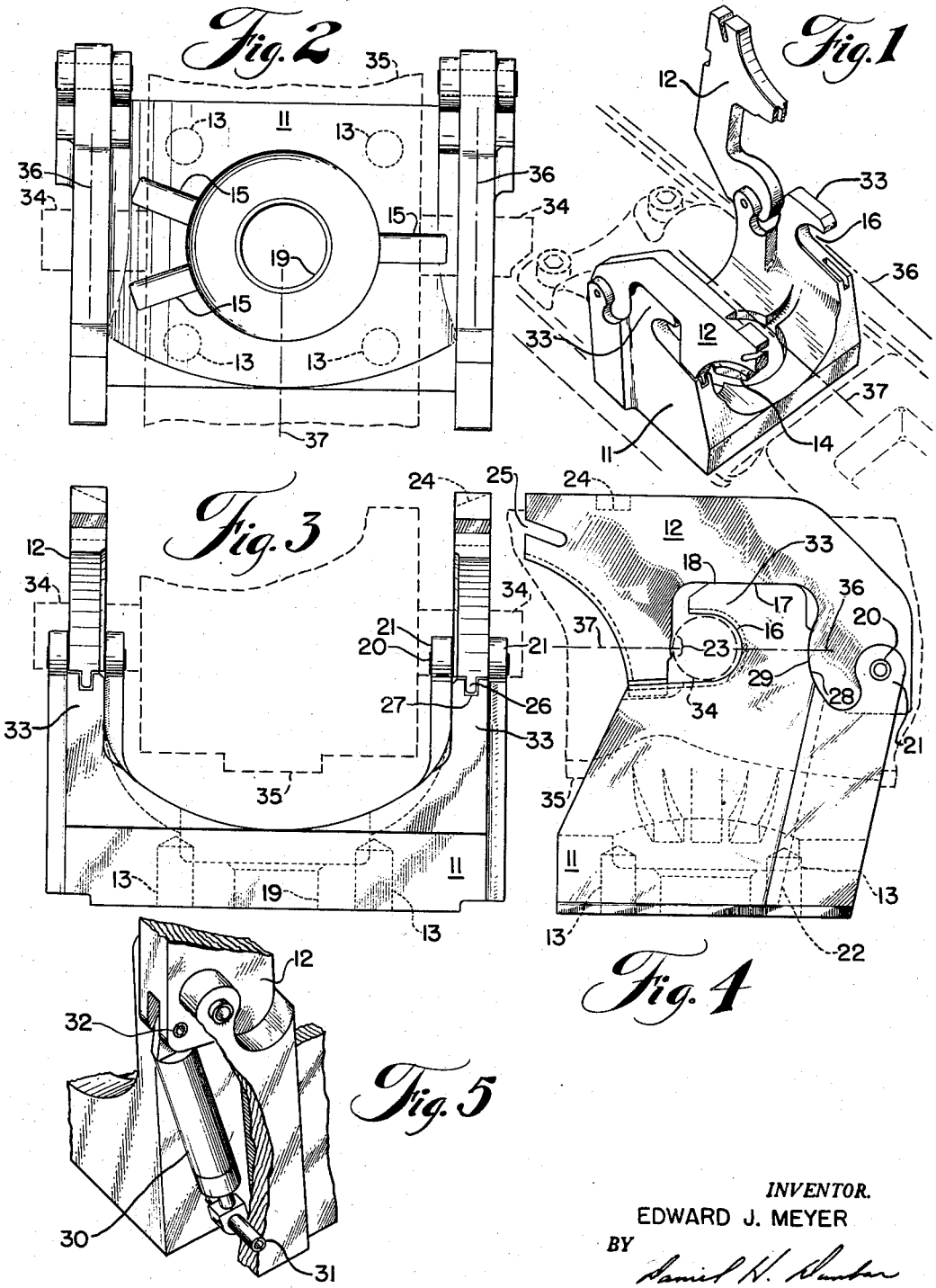

United States Patent Office 2,889,752
Patented June 9, 1959

2,889,752

LATCH TYPE AIRCRAFT GUN MOUNT

Edward J. Meyer, Normandy, Mo., assignor to North American Aviation, Inc.

Application December 31, 1956, Serial No. 631,592

6 Claims. (Cl. 89—37.5)

This invention relates broadly to an aircraft gun mount, and is more particularly concerned with a form of aircraft gun mount provided with novel latch means.

Severe limiting conditions are often encountered in the design and construction of aircraft gun mounts, and often it has been necessary to sacrifice certain qualities because of such limitations. To overcome such limitations I have invented the gun mount disclosed and claimed herein, keeping several objectives foremost in mind.

It is an object of this invention to provide a gun mount that will permit installation of gun mounting lugs therein from a direction parallel to the axis of the gun.

Another object of this invention is to provide latching means associated with the mount which will effectively restrain inserted gun lugs from movement caused by recoil and counter-recoil forces.

Another object of the present invention is to provide a gun mount latching arrangement wherein the latching means is additionally urged into an engageable position by counter-recoil forces created within the gun during its firing.

A further object of this invention lies in the provision of means in the latching arrangement which will assure positive location of the gun mount component parts and gun mounting lugs with respect to each other.

Still another object of the invention is to provide a gun mount which permits convenient installation and removal of gun mounting lugs from the gun mount.

A still further object of the present invention is to provide a gun mount construction which is compact and relatively free from fabrication and maintenance complexities.

Other objects and advantages of the invention will become more apparent during the course of the following description, particularly when taken in connection with the accompanying drawings.

Referring to the drawings:

Fig. 1 is a perspective view of the gun mount of my invention;

Fig. 2 is a plan view of the gun mount;

Fig. 3 is a front elevational view of the gun mount as shown in Fig. 2;

Fig. 4 is a side elevational view of the mount as shown in Fig. 2; and

Fig. 5 is a perspective view of a portion of an alternate embodiment of the gun mount of my invention showing a supplemental latch urging means in detail.

In Fig. 1, I illustrate the gun mount of my invention which essentially is comprised of a mounting yoke member 11 with latch members 12 pivotally connected thereto. Because of the relatively high stresses encountered in gun mounts of this nature, it is preferred that the mount be made of an alloy steel, although other metallic compositions might prove adequate under specified non-severe conditions.

Also, certain environmental aircraft structure is shown in Fig. 1 in dashed lines. It is to this airplane structure that the gun mount is normally secured. To this end, dowel pins (not shown) are provided in the airframe structure in proper position to locate and cooperate with holes 13 provided in the base portion of yoke member 11. The dowel pins are so sized and located as to permit a small degree of pivoting and sliding of yoke member 11 with respect to the airframe structure. This enables the gun mount position to be adjusted for proper alignment and accurate gun azimuth.

A threaded and headed fastener such as the bolt shown at 14 is utilized to secure the mounting yoke 11 to the airframe. Entry of the threaded portion of bolt 14 to the airframe is made through hole 19 in the base portion of mounting yoke 11. Radial keyways 15 are provided to accommodate means such as a tab washer and safety wire for safety purposes; however, detailed illustration of the tab washer and safety wire is not shown.

Mounting yoke 11 is provided with a recess 16 in each of its ear portions 33. This recess is sized to just accommodate a mounting lug 34 of the gun 35, a portion of which is outlined by dashed lines intended for installation in the gun mount. The entry axis 36 of recess 16 is oriented in a direction parallel to the axis 37 of the installed gun 35, and entry of the gun mounting lug in recess 16 can be made only from that direction.

A substantially flat surface portion 17 is provided in the upper edge of each ear 33 of mounting yoke 11 and this surface portion cooperates with a correspondingly flat surface portion 18 provided on the under side of each latch member 12 to serve as positive stop means, thus accurately positioning the latch member 12 with respect to the mounting yoke 11 when the latch has been properly "closed." Latch members 12 are preferably pivotally connected to mounting yoke 11 by the use of roll pins 20, and the rearward portion of latch 12 is inserted between certain wall portions 21 of the ear 33 of mounting yoke 11 which are created by the machining of an almost vertical slot in the back of each ear 33 of mounting yoke 11. An edge of the vertical slot is shown at 22 in Fig. 4.

Each latch member 12 is provided with a surface portion 23 designed to engage the surface of the gun mounting lug 34 cooperating therewith when the lug has been properly inserted into the gun mount. Surface portion 23 is an arcuate surface portion, contoured to correspond with the surface contour of the gun mounting lug. This surface portion, although not of great length, provides more bearing surface than would line contact created by use of a flat surface. Because the recoil and counter-recoil forces created during firing of the gun 35 are substantially parallel its axis 37, it is important that the arcuate surface portion 23 be substantially normal to the line of action of such forces when engaged with a gun mounting lug.

Latch members 12 are also provided along their upper surface with cut-out sections 24 to engage the safety locks normally provided on a gun, and diagonal slots 25 are additionally provided to facilitate opening of the latch by screw-driver or like means preparatory to removal of the gun from its mounts. Further, tongues 26 which cooperate with slots 27 are provided in each ear 33 of yoke member 11 to restrain any possible twisting forces urged upon the latch members.

As previously pointed out, surface portion 18 of latch member 12 cooperates with surface portion 17 of the ear 33 of mounting yoke 11 to provide positive location of the latch 12, and hence arcuate surface portion 23, with respect to an installed gun mounting lug at the "closed" position.

It is desirable to emphasize that a camming action is provided between a surface portion 28 of latch member 12 and a surface portion 29 provided on the edge of the ear 33 of mounting yoke 11. As latch member 12 is moved into its "closed" position with respect to mounting yoke member 11, surface portions 28 and 29 come into engagement with each other in such a manner that counter-recoil forces transmitted to latch member 12 at its arcuate surface portion 23 are in turn transmitted directly into mounting yoke member 11, rather than through pin connection 20. Recoil forces are transmitted directly into mounting yoke 11 at the surface of recess 16.

As shown in Fig. 1, latch members 12 are capable of assuming either an "open" position, which permits entry of a mounting lug into the gun mount, or a "closed" position, which effects restraint of the mounting lug within the mount. As previously mentioned, insertion of the mounting lugs 34 into the gun mount must be in a direction generally parallel to the axis 37 of the gun 35, and should preferably be from the muzzle-end of the gun. When the lugs are properly located in recess 16, latch members 12 are then closed, preferably with a slight forcing action.

When the latches have been properly closed, several conditions exist. First, the gun mounting lugs 34 are in contact with the surface portion of recess 16 to restrain gun recoil motion. Second, arcuate surface portions 23 of latch members 12 are likewise in contact with the opposed surfaces of the gun mounting lugs 34 to restrain counter-recoil motion. Third, surface portions 28 of latch members 12 and surface portions 29 of the ears 33 of mounting yoke 11 are in contact to properly locate all components relative to each other. This arrangement further results in a very rigid assembly of the component parts.

Recoil forces and counter-recoil forces are hence transmitted directly into the mounting yoke and in turn into the airframe of the aircraft.

It is also to be particularly noted that the line of action of the counter-recoil forces transmitted into latch member 12 does not pass through the center of roll pin 20 which serves as a pivot connection. As the mount is shown in Fig. 4, the line of action of the counter-recoil force passes horizontally along lines 36 and above roll pin 20. The effect of this arrangement is to cause the counter-recoil forces to create a moment on latch member 12 which urges the latch member only into its "closed" relationship with mounting yoke member 11. The effectiveness of this arrangement has been proved in extensive testing in which even gun safety locks, which are normally associated with diagonal slots 24, have not been employed. During severe firing the gun mount latches did not tend toward the "open" position.

In Fig. 5 there is shown a fragmentary view of an alternate embodiment of the gun mount of the present invention in which there is additionally employed compression spring means in the form of bungee 30, the construction of which is generally well known in the art. In this arrangement, the bungee is located in the slot provided at the rear of the ear portion 33 of mounting yoke member 11, and said bungee is pivotally connected to mounting yoke member 11 through roll pin 31 and to latch member 12 through roll pin 32. It may thus be seen that the bungee is structurally joined to mounting yoke member 11 and latch member 12 in a manner by which the bungee will urge latch member 12 into either a completely "open" position or a completely "closed" position, depending upon its location to either side of its dead center position. While use of the disclosed spring means is not required in all applications, it may be found upon occasion to be desirable to employ such means.

It is to be understood that the form of the invention herewith shown and described is to be taken as the preferred embodiment of the same, but that various changes in the shape, size and arrangement of parts may be resorted to without departing from the spirit of the invention or the scope of the subjoined claims.

I claim:
1. In an aircraft gun mount constructed to receive mounting lugs of a gun, in combination, a mounting yoke member having ear portions, each ear portion being provided with a lug receiving recess therein and a stop surface thereon, and hinged latch members pivotally connected to the mounting yoke member, each latch member having a stop surface thereon cooperable with a mounting yoke member ear stop surface, said latch members having gun mounting lug restraining surfaces cooperably engageable with gun mounting lugs when said latch stop surfaces are engaged with said mounting yoke member ear stop surfaces.

2. In an aircraft gun mount for restraining the mounting lugs of a gun in a direction along the gun longitudinal axis, in combination: a yoke member having a lug-receiving recess, a U-shaped latch member having leg portions joined by a base portion, surface portions contained in said recess and in one of said leg portions and oriented perpendicular to the gun longitudinal axis for contact with the mounting lugs, and pivot means connecting the other of said latch member leg portions to said yoke member, said pivot means being offset from a line extending between said surface portions a distance toward the latch member extreme portion opposite said base portion whereby gun forces transmitted to said latch member from the gun mounting lugs urge said latch member in a direction away from its open position.

3. The gun mount defined in claim 2, wherein said latch member contacts a gun mounting lug in a closed position and rotates about said pivot means to an open position out of engagement with the gun mounting lug, and wherein there is included a bungee spring means connected to said yoke member and connected to said other leg portion in over-center offset relation to said pivot means to urge said latch member toward said closed position, said bungee spring means being compressed when said latch member occupies said closed position and being further compressed when said latch member occupies a position intermediate said closed position and said open position.

4. An aircraft gun installation including a gun and a gun mount for restraining the mounting lug of the gun in a direction parallel the gun longitudinal axis, and comprising: a yoke member having a recess surface portion generally perpendicular the gun longitudinal axis to restrain the gun mounting lug in a first direction, a generally U-shaped latch member having first and second leg portions and having a surface portion in said first leg portion which is generally perpendicular the gun longitudinal axis to restrain the gun mounting lug in a second direction, and pin means rotatably connecting said latch member second leg portion to said yoke member, said pin means being located below a line extending from said yoke member surface portion to said latch member first leg surface portion, and said yoke member recess surface portion being longitudinally positioned intermediate said latch member surface portion and said pin means, whereby forces transmitted to said latch member first leg portion by the gun mounting lug urge said latch member away from its open position.

5. An aircraft gun mount for restraining the mounting lug of a gun in a direction parallel the gun longitudinal axis, and comprising: a yoke member having a recess receiving the gun mounting lug and having a contoured surface portion extended transverse the gun longitudinal axis and spaced-apart from said recess, a U-shaped latch member contacting the gun mounting lug and having a surface portion in one leg thereof extended transverse the gun longitudinal axis and contoured to correspond to the yoke member contoured surface portion, and hinge means connecting said latch member to said yoke member, said latch member contoured surface portion contacting said yoke member contoured surface portion when said latch member contacts the gun mounting lug, whereby gun forces acting on said latch member are transmitted directly to said yoke member in by-pass relation to said hinge means.

6. The aircraft gun mount defined in claim 5, wherein said yoke member recess has an entry axis parallel the gun longitudinal axis, and wherein said hinge means connects said latch member leg to said yoke member, said hinge means being located below the line of said entry axis, whereby gun forces transmitted directly to said yoke member through said latch member also urge said latch member in a direction away from its open position.

References Cited in the file of this patent

UNITED STATES PATENTS

| | | |
|---|---|---|
| 1,569,014 | Haubroe | Jan. 12, 1926 |
| 2,362,012 | Kendall et al. | Nov. 7, 1944 |
| 2,426,498 | Franklin | Aug. 26, 1947 |

FOREIGN PATENTS

| | | |
|---|---|---|
| 523,261 | France | Apr. 26, 1921 |
| 674,827 | France | Oct. 28, 1929 |
| 560,383 | Great Britain | Apr. 3, 1944 |